US011917445B2

(12) United States Patent
Chen et al.

(10) Patent No.: US 11,917,445 B2
(45) Date of Patent: *Feb. 27, 2024

(54) METHODS AND APPARATUSES FOR CONDITIONAL HANDOVER IN WIRELESS COMMUNICATION SYSTEMS

(71) Applicant: FG Innovation Company Limited, Tuen Mun (HK)

(72) Inventors: Hung-Chen Chen, Taipei (TW); Yung-Lan Tseng, Taipei (TW); Mei-Ju Shih, Taipei (TW); Chie-Ming Chou, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/748,513

(22) Filed: May 19, 2022

(65) Prior Publication Data

US 2022/0279372 A1 Sep. 1, 2022

Related U.S. Application Data

(63) Continuation of application No. 16/863,963, filed on Apr. 30, 2020, now Pat. No. 11,375,392.
(Continued)

(51) Int. Cl.
*H04W 24/10* (2009.01)
*H04W 24/08* (2009.01)
(Continued)

(52) U.S. Cl.
CPC .......... *H04W 24/10* (2013.01); *H04L 5/0048* (2013.01); *H04W 24/08* (2013.01);
(Continued)

(58) Field of Classification Search
CPC . H04W 24/08; H04W 24/10; H04W 36/0058; H04W 36/0083; H04W 36/36;
(Continued)

(56) References Cited

U.S. PATENT DOCUMENTS 9,942,086 B2 * 4/2018 Xu ...................... H04L 41/0654
10,827,398 B2 * 11/2020 Park .................. H04W 36/0016
(Continued)

FOREIGN PATENT DOCUMENTS

KR 20180122935 A 11/2018
WO 2018/194326 A1 10/2018
(Continued)

OTHER PUBLICATIONS

Non-Final Rejection dated Jul. 7, 2021 for U.S. Appl. No. 16/863,963 which is the parent application of the instant application.
(Continued)

*Primary Examiner* — Jean A Gelin
(74) *Attorney, Agent, or Firm* — ScienBiziP, P.C.

(57) ABSTRACT

A method performed by a BS for CHO is provided. The method includes transmitting a CHO command to a UE, the CHO command including a CHO command ID and a measurement ID associated with the CHO command ID; causing the UE to execute the CHO command to handover to a target BS when a trigger condition associated with the measurement ID is fulfilled; causing the UE to forgo transmitting the measurement report during the execution of the CHO command despite the UE being configured, via a report configuration associated with the measurement ID, to transmit the measurement report; transmitting, to the UE, a message that causes the UE to remove the CHO command; and after transmitting the message to the UE, determining
(Continued)

that the report configuration is removed by the UE without transmitting, to the UE, an instruction to remove the report configuration.

14 Claims, 8 Drawing Sheets

Related U.S. Application Data

(60) Provisional application No. 62/842,202, filed on May 2, 2019, provisional application No. 62/842,211, filed on May 2, 2019.

(51) Int. Cl.
| | |
|---|---|
| *H04W 36/00* | (2009.01) |
| *H04W 56/00* | (2009.01) |
| *H04W 76/27* | (2018.01) |
| *H04L 5/00* | (2006.01) |

(52) U.S. Cl.
CPC ... *H04W 36/0058* (2018.08); *H04W 36/0083* (2013.01); *H04W 56/0015* (2013.01); *H04W 76/27* (2018.02)

(58) Field of Classification Search
CPC . H04W 56/0015; H04W 76/11; H04W 76/12; H04L 5/0023; H04L 5/0048; H04L 5/0091
See application file for complete search history.

(56) References Cited

U.S. PATENT DOCUMENTS

| | | | | |
|---|---|---|---|---|
| 2013/0072182 A1* | 3/2013 | Jung | ............ | H04W 24/10 455/422.1 |
| 2014/0126545 A1* | 5/2014 | Tamura | ............ | H04W 36/0079 370/332 |
| 2014/0295840 A1* | 10/2014 | Keskitalo | ............ | H04W 24/10 455/436 |
| 2016/0285679 A1* | 9/2016 | Dudda | ............ | H04W 36/0055 |
| 2017/0105136 A1* | 4/2017 | Reider | ............ | H04W 72/04 |
| 2018/0206171 A1 | 7/2018 | Basu Mallick et al. | | |
| 2018/0317137 A1* | 11/2018 | Loehr | ............ | H04W 36/023 |
| 2019/0387438 A1* | 12/2019 | Chang | ............ | H04W 36/36 |
| 2020/0045602 A1* | 2/2020 | Jiang | ............ | H04W 36/0079 |
| 2020/0084683 A1* | 3/2020 | Moosavi | ............ | H04W 36/24 |
| 2020/0229043 A1* | 7/2020 | Yao | ............ | H04W 36/08 |
| 2021/0014753 A1* | 1/2021 | Ma | ............ | H04W 36/0088 |
| 2021/0029600 A1* | 1/2021 | Balan | ............ | H04W 36/24 |
| 2021/0076271 A1* | 3/2021 | Jokela | ............ | H04W 36/36 |

FOREIGN PATENT DOCUMENTS

| | | |
|---|---|---|
| WO | 2018/203716 A1 | 11/2018 |
| WO | 2019028814 A1 | 2/2019 |

OTHER PUBLICATIONS

Final Rejection dated Nov. 3, 2021 for U.S. Appl. No. 16/863,963 which is the parent application of the instant application.

Advisory Action dated Jan. 27, 2022 for U.S. Appl. No. 16/863,963 which is the parent application of the instant application.

Notice of Allowance dated Mar. 10, 2022 for U.S. Appl. No. 16/863,963 which is the parent application of the instant application.

3GPP TS 38331, "3rd Generation Partnership Project; Technical Specification Group Radio Access Network; NR; Radio Resource Control (RRC) protocol specification (Release 15)", V15.5.1 (Apr. 2019).

LG Electronics Inc, "Conditional handover procedure", 3GPP TSG-RAN2#101 Athens, Greece, Feb. 26-Mar. 2, 2018, R2-1802693, Paragraph [0001]-Paragraph [0002], Figure 1.

\* cited by examiner

METHODS AND APPARATUSES FOR CONDITIONAL HANDOVER IN WIRELESS COMMUNICATION SYSTEMS

CROSS-REFERENCE TO RELATED APPLICATION(S)

The present application is a continuation application of U.S. patent application Ser. No. 16/863,963, filed on Apr. 30, 2020, entitled "METHODS AND APPARATUSES FOR CONDITIONAL HANDOVER IN WIRELESS COMMUNICATION SYSTEM," which claims the benefit of and priority to U.S. Provisional Patent Application Ser. No. 62/842,202, filed on May 2, 2019, entitled "Execution and Handling of Conditional Handover Command" and U.S. Provisional Patent Application Ser. No. 62/842,211, filed on May 2, 2019, entitled "Collision and Failure Handling of Conditional Handover Command Execution." The contents of all of the above-named applications are hereby fully incorporated herein by reference for all purposes.

FIELD

The present disclosure generally relates to wireless communications, and more particularly, to methods and apparatuses for Conditional Handover (CHO) in a wireless communication system.

BACKGROUND

With the tremendous growth in the number of connected devices and the rapid increase in user/network traffic volume, various efforts have been made to improve different aspects of wireless communication for the next generation wireless communication system, such as the fifth generation (5G) New Radio (NR), by improving data rate, latency, reliability and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there exists a need for further improvements in the art.

SUMMARY

The present disclosure is directed to methods and apparatuses of CHO in a wireless communication system.

According to a first aspect of the present disclosure, a method of wireless communication is provided. The method includes a User Equipment (UE) receiving a CHO command from a source base station (BS). The CHO command includes a CHO command identity (ID) and a measurement ID associated with the CHO command ID. The method further includes the UE executing the CHO command to handover the UE to a target BS when a trigger condition associated with the measurement ID is fulfilled.

According to a second aspect of the present disclosure, a UE is provided. The UE includes one or more non-transitory computer-readable media having computer-executable instructions embodied thereon and at least one processor coupled to the one or more non-transitory computer-readable media. The at least one processor is configured to execute the computer-executable instructions to receive a CHO command from a source BS. The CHO command includes a CHO command ID and a measurement ID associated with the CHO command ID. The at least one processor is further configured to execute the computer-executable instructions to execute the CHO command to handover the UE to a target BS when a trigger condition associated with the measurement ID is fulfilled.

According to a third aspect of the present disclosure, a method for a Base Station (BS) for performing a Conditional Handover (CHO) procedure is provided. The method includes transmitting a CHO command to a User Equipment (UE), the CHO command including a CHO command identity (ID) and a measurement ID associated with the CHO command ID; causing the UE to execute the CHO command to handover to a target BS when a trigger condition associated with the measurement ID is fulfilled; causing the UE to forgo transmitting the measurement report during the execution of the CHO command despite the UE being configured, via a report configuration associated with the measurement ID, to transmit the measurement report; transmitting, to the UE, a message that causes the UE to remove the CHO command; and after transmitting the message to the UE, determining that the report configuration is removed by the UE without transmitting, to the UE, an instruction to remove the report configuration.

In some implementations of the third aspect of the present disclosure, the message is included in a Radio Resource Control (RRC) message.

In some implementations of the third aspect of the present disclosure, the method further includes transmitting a cell-level Reference Signal (RS) or a beam-level RS to the UE to let the UE to determine whether the trigger condition is fulfilled.

In some implementations of the third aspect of the present disclosure, the cell-level RS includes a Synchronization Signal Block (SSB) and the beam-level RS includes a Channel State Information-Reference Signal (CSI-RS).

In some implementations of the third aspect of the present disclosure, the method further includes receiving CHO failure information in a Minimization of Drive Tests (MDT) report from the UE in a case that the execution of the CHO command fails.

In some implementations of the third aspect of the present disclosure, the CHO failure information in the MDT report includes at least one of: an ID of a failed CHO command, a configuration related to the failed CHO command, a cause value indicating a CHO failure event, an ID of a failed target cell, an ID of a failed target BS, or a latest measurement result.

In some implementations of the third aspect of the present disclosure, the method further includes performing a Radio Resource Control (RRC) re-establishment procedure with the UE; and determining that all CHO commands stored at the UE are removed by the UE when performing the RRC re-establishment procedure.

According to a fourth aspect of the present disclosure, a Base Station (BS) for performing a Conditional Handover (CHO) procedure is provided. The BS includes transmission and reception circuitry and at least one processor coupled to the transmission and reception circuitry. The at least one processor is configured to transmit, by the transmission and reception circuitry, a CHO command to a User Equipment (UE), the CHO command including a CHO command identity (ID) and a measurement ID associated with the CHO command ID; cause the UE to execute the CHO command to handover to a target BS when a trigger condition associated with the measurement ID is fulfilled; cause the UE to forgo transmitting the measurement report during the execution of the CHO command despite the UE being configured, via a report configuration associated with the measurement ID, to transmit the measurement report; transmit, by the transmission and reception circuitry, to the UE, a message that causes the UE to remove the CHO command; and after transmitting the message to the UE, determine that the report configuration is removed by the UE without transmitting, to the UE, an instruction to remove the report configuration to the UE.

In some implementations of the fourth aspect of the present disclosure, the message is included in a Radio Resource Control (RRC) message.

In some implementations of the fourth aspect of the present disclosure, the at least one processor is further configured to transmit, by the transmission and reception circuitry, a cell-level Reference Signal (RS) or a beam-level RS to the UE to let the UE to determine whether the trigger condition is fulfilled.

In some implementations of the fourth aspect of the present disclosure, the cell-level RS includes a Synchronization Signal Block (SSB) and the beam-level RS includes a Channel State Information-Reference Signal (CSI-RS).

In some implementations of the fourth aspect of the present disclosure, the at least one processor is further configured to receive, by the transmission and reception circuitry, CHO failure information in a Minimization of Drive Tests (MDT) report from the UE in a case that the execution of the CHO command fails.

In some implementations of the fourth aspect of the present disclosure, the CHO failure information in the MDT report includes at least one of an ID of a failed CHO command, a configuration related to the failed CHO command, a cause value indicating a CHO failure event, an ID of a failed target cell, an ID of a failed target BS, or a latest measurement result.

In some implementations of the fourth aspect of the present disclosure, the at least one processor is further configured to perform a Radio Resource Control (RRC) re-establishment procedure with the UE; and determine that all CHO commands stored at the UE are removed by the UE when performing the RRC re-establishment procedure.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DETAILED DESCRIPTION

Figure 1A:
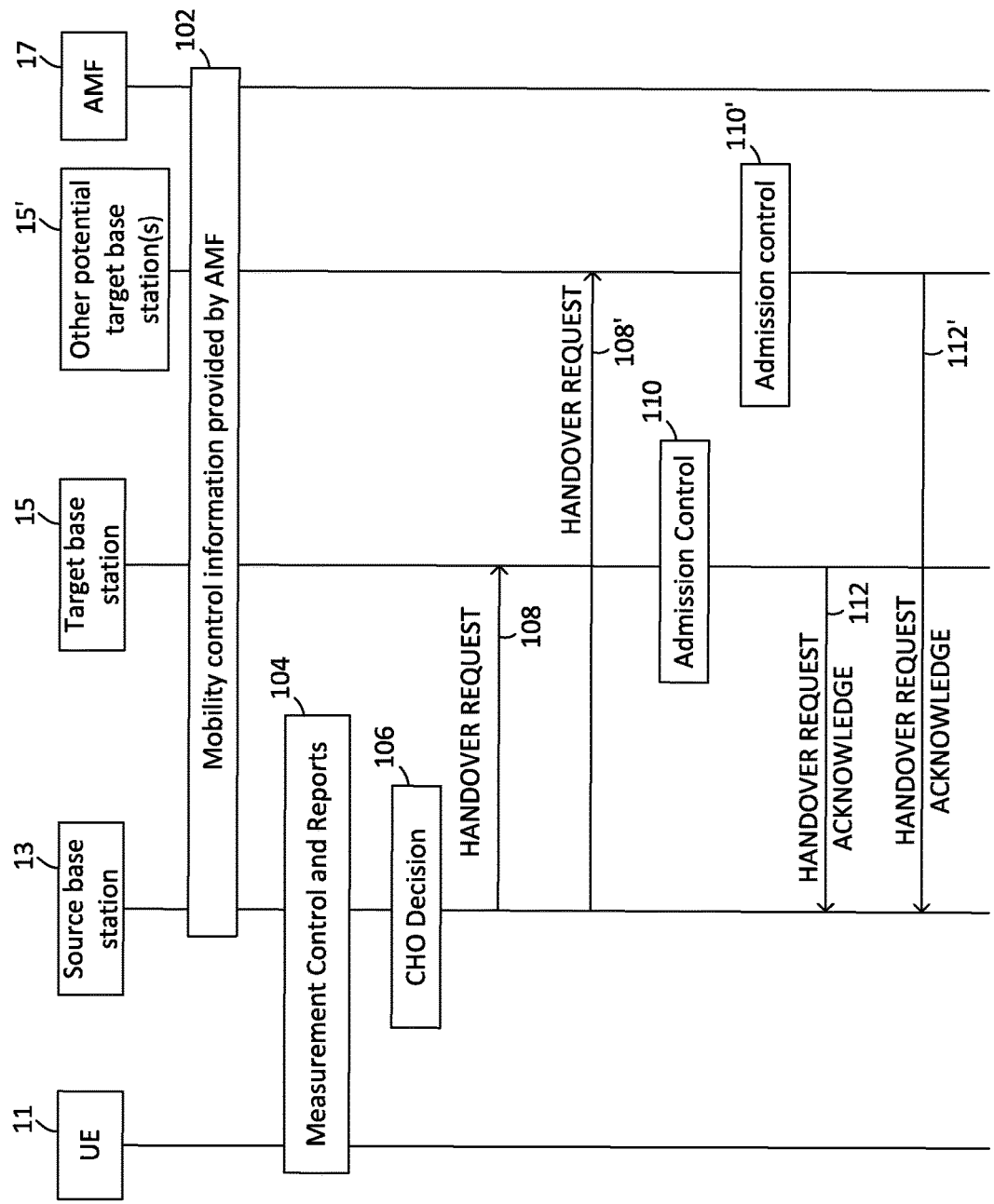
FIG. 1A is a diagram illustrating a CHO procedure, according to an implementation of the present disclosure.

The following description contains specific information pertaining to example implementations in the present disclosure. The drawings in the present disclosure and their accompanying detailed descriptions are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not shown) by the same numerals in the example figures. However, the features in different implementations may be different in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series, and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software, or a combination of software and hardware. Described functions may correspond to modules which may be software, hardware, firmware, or any combination thereof. The software implementation may comprise computer executable instructions stored on computer readable media, such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuits (ASICs), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one BS, at least one User Equipment (UE), and one or more optional network elements that provide connection towards a network. The UE communicates with the network (e.g., a Core Network (CN), an Evolved Packet Core (EPC) network, an Evolved Universal Terrestrial Radio Access Network (E-UTRAN), a 5G Core (5GC), or an internet) through a RAN established by one or more BSs.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A BS may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic Wideband-Code Division Multiple Access (W-CDMA), High-Speed Packet Access (HSPA), LTE, LTE-A, eLTE (evolved LTE, e.g., LTE connected to 5GC), NR (often referred to as 5G), and/or LTE-A Pro. However, the scope of the present disclosure should not be limited to the above-mentioned protocols.

A BS may include, but is not limited to, a node B (NB) as in the UNITS, an evolved Node B (eNB) as in the LTE or LTE-A, a Radio Network Controller (RNC) as in the UNITS, a Base Station Controller (BSC) as in the GSM/GERAN, a ng-eNB as in an Evolved Universal Terrestrial Radio Access (E-UTRA) BS in connection with the 5GC, a next generation Node B (gNB) as in the 5G-RAN, and any other apparatus capable of controlling radio communication and managing radio resources within a cell. The BS may serve one or more UEs through a radio interface.

The BS may be operable to provide radio coverage to a specific geographical area using a plurality of cells included in the RAN. The BS supports the operations of the cells. Each cell may be operable to provide services to at least one UE within its radio coverage. More specifically, each cell (often referred to as a serving cell) may provide services to serve one or more UEs within its radio coverage (e.g., each cell schedules the downlink and optionally uplink resources to at least one UE within its radio coverage for downlink and optionally uplink packet transmissions). The BS can communicate with one or more UEs in the radio communication system through the plurality of cells. A cell may allocate Sidelink (SL) resources for supporting Proximity Service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as eMBB, mMTC, URLLC, while fulfilling high reliability, high data rate and low latency requirements. The Orthogonal Frequency-Division Multiplexing (OFDM) technology as agreed in the $3^{rd}$ Generation Partnership Project (3GPP) may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval of a single NR frame, a Downlink (DL) transmission data, a guard period, and an Uplink (UL) transmission data should at least be included, where the respective portions of the DL transmission data, the guard period, the UL transmission data should also be configurable, for example, based on the network dynamics of NR. In addition, SL resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

In a wireless communication network, such as an E-UTRAN, one of the main causes of handover failure is that a UE does not receive a Handover Command message from a source BS (e.g., a source eNB/gNB) or a serving BS (e.g., a serving eNB/gNB). A conventional handover procedure may be triggered by a measurement report from the UE. For example, if the serving cell's quality (e.g., signal strength and/or service quality) is below a preconfigured threshold while the neighboring cell's quality (e.g., signal strength and/or service quality) is above a preconfigured threshold, the UE may send a measurement report to the source BS based on the received measurement configurations. Upon receiving the measurement report, the source BS may send a Handover Request message to multiple target BSs for admission control and receive Handover Acknowledgement messages from the target BSs. The source BS may select and send a Handover Command message (e.g., a Radio Resource Control (RRC) Reconfiguration message) containing the target cell configuration(s) that is embedded in a Handover Acknowledgement message from one of the target BSs to the UE so that the UE can connect to the target cell.

The success of a handover procedure depends on several factors. One of the factors is that the serving cell quality does not drop rapidly within a short period of time, which may be dominated by the latency of the backhaul (e.g., for X2/Xn/Xx interface), the processing time of target BSs, and the signaling transmission time. Unfortunately, in a real-world situation, the serving cell quality may drop very quickly within a short period of time, and the UE may not successfully receive the Handover Command message before the serving cell quality drops significantly. As a result, the UE may detect a radio link failure. Consequently, in response to detecting the radio link failure, the UE may initiate an RRC Connection Re-establishment procedure, which in turn leads to a considerable amount of service interruption time. In a wireless communication system (e.g., a 5G NR system) applying massive antenna beamforming technology in high-frequency bands, a serving cell quality may degrade even faster, especially when narrow beams are used to serve the UE. Also, blockage is another issue in NR deployments.

The CHO technology is introduced to improve the reliability of the handover procedure. The CHO procedure may be considered as a supplementary procedure to a conventional handover procedure to help reduce the handover failure rate.

In one implementation, to execute a CHO command, a UE may start evaluating the trigger condition(s) associated with the CHO command to determine whether the trigger condition(s) for the CHO command is fulfilled. If the UE determines that a trigger condition is fulfilled, the UE may apply/execute the corresponding CHO command to connect to a target cell (or initiate the execution of the corresponding CHO command to connect to a target cell).

Certain measurement events (e.g., A3 and A5 events) may be used for determining whether a trigger condition of a CHO command is fulfilled. However, detailed procedures for linking a trigger condition of a CHO command with a measurement event are still not defined. On the other hand, measurement events may be used for determining whether a leaving condition of a CHO command is fulfilled. If the leaving condition is fulfilled, the UE may remove (or release) the corresponding CHO command accordingly. Moreover, a CHO command or a measurement configuration may be modified or released based on Network (NW) command(s)/configuration(s) or UE autonomous behavior. Keeping a correct linking of a CHO command and the corresponding measurement configuration is required to avoid error UE behavior. To this end, methods of CHO are provided in various implementations of the present disclosure.

In LTE or NR, a UE may apply system information acquisition and change monitoring procedures for the Primary Cell (PCell). System information may change for certain reasons, but the change of system information may occur at specific radio frames, e.g., a modification period. System information may be transmitted a number of times with the same content within the modification period, as defined by its corresponding scheduling scheme.

In some implementations, a CHO command may include at least one of the following: a trigger condition, a leaving condition, a target cell ID, a carrier frequency (e.g., NR-Absolute Radio Frequency Channel Number (ARFCN)) of the target cell, a lifetime of the CHO, a handover priority (e.g., handover priority, or CHO command priority), a CHO command ID (or "CHO configuration ID"), a dedicated Random Access Channel (RACH) configuration(s), and a common RACH configuration(s) (e.g., for optionally providing resources for a contention-free random access).

In some implementations, the CHO command may include the information that indicates to a UE to CHO to another Radio Access Technology (RAT). In some implementations, the CHO command may include the information that indicates the target RAT type (e.g., targetRAT-Type). In some implementations, the CHO command may include a container that contains a target cell configuration (e.g., an RRC reconfiguration message that is specified in another standard, as indicated by the target RAT type) to carry information about the target cell identifier(s), or the radio parameters relevant to the target RAT. In some implementations, the CHO command may include the information for delivering the key synchronization and key freshness to handover to another RAT. In some implementations, the CHO command may include a security algorithm configuration (or the related information). For example, the security algorithm configuration may be used in at least one of a CHO process between cells within E-UTRA/5GC, a handover process to E-UTRA/5GC (e.g., handover from NR to E-UTRA/5GC, handover from E-UTRA/EPC to E-UTRA/5GC), a handover process from NR to E-UTRA/EPC, and a handover process from E-UTRA/5GC to E-UTRA/EPC.

In some implementations, the measurement configuration Information Element (IE) (e.g., MeasConfig in the 3GPP Technical Specification (TS) 38.331) received by the UE may include at least one of the following: a list of measurement objects to be removed (e.g., MeasObjectToRemoveList), a list of measurement objects to be added and/or modified (e.g., IE MeasObjectToAddModList), a list of measurement report configurations to be removed (e.g., ReportConfigToRemoveList), a list of measurement report configurations to be added and/or modified (e.g., IE ReportConfigToAddModList), a list of measurement IDs to be removed (e.g., MeasIdToRemoveList), and a list of measurement IDs to be added and/or modified (e.g., IE MeasIdToAddModList).

The IE MeasConfig may specify the measurements to be performed by the UE, which may cover at least one of intra-frequency, inter-frequency, and inter-RAT mobility. The IE MeasConfig may further include the configuration of measurement gaps. An example Text Proposal (TP) of the measurement configuration (e.g., IE MeasConfig) is shown in Table 1.

TABLE 1

```
-- ASN1START
-- TAG-MEASCONFIG-START
MeasConfig ::=                  SEQUENCE {
    measObjectToRemoveList          MeasObjectToRemoveList
    OPTIONAL, -- Need N
    measObjectToAddModList          MeasObjectToAddModList
    OPTIONAL, -- Need N
    reportConfigToRemoveList        ReportConfigToRemoveList
    OPTIONAL, -- Need N
    reportConfigToAddModList        ReportConfigToAddModList
    OPTIONAL, -- Need N
    measIdToRemoveList              MeasIdToRemoveList
    OPTIONAL, -- Need N
    measIdToAddModList              MeasIdToAddModList
```

TABLE 1-continued

```
OPTIONAL, -- Need N
    s-MeasureConfig              CHOICE {
        ssb-RSRP                     RSRP-Range,
        csi-RSRP                     RSRP-Range
    }
OPTIONAL, -- Need M
    quantityConfig               QuantityConfig
OPTIONAL, -- Need M
    measGapConfig                MeasGapConfig
OPTIONAL, -- Need M
    measGapSharingConfig         MeasGapSharingConfig
OPTIONAL, -- Need M
    ...
}
    MeasObjectToRemoveList ::=   SEQUENCE (SIZE (1..maxNrofObjectId)) OF MeasObjectId
    MeasIdToRemoveList ::=       SEQUENCE (SIZE (1..maxNrofMeasId)) OF MeasId
    ReportConfigToRemoveList ::= SEQUENCE (SIZE (1..maxReportConfigId)) OF ReportConfigId
-- TAG-MEASCONFIG-STOP
```

In some implementations, the measurement object (or the corresponding measurement object configuration) indicated in the measurement configuration may be associated with a measurement object ID (e.g., MeasObjectId). An example TP of the list of measurement objects to be added and/or modified (e.g., IE MeasObjectToAddModList) is shown in Table 2.

TABLE 2

```
-- ASN1START
-- TAG-MEASOBJECTTOADDMODLIST-START
MeasObjectToAddModList ::=       SEQUENCE (SIZE
                                 (1..maxNrofObjectId))
                                 OF MeasObjectToAddMod
MeasObjectToAddMod ::=           SEQUENCE {
    measObjectId                 MeasObjectId,
    measObject                   CHOICE {
        measObjectNR                 MeasObjectNR,
        ... ,
        measObjectEUTRA              MeasObjectEUTRA
    }
}
-- TAG-MEASOBJECTTOADDMODLIST-STOP
-- ASN1STOP
```

In some implementations, a (measurement) report configuration may be associated with a report configuration ID (e.g., ReportConfigId). An example TP of the list of report configurations to added or modified (e.g., IE ReportConfigToAddModList) is shown in Table 3.

TABLE 3

```
-- ASN1START
-- TAG-REPORTCONFIGTOADDMODLIST-START
ReportConfigToAddModList ::=     SEQUENCE (SIZE
                                 (1..maxReportConfigId))
                                 OF ReportConfigToAddMod
ReportConfigToAddMod ::=         SEQUENCE {
    reportConfigId               ReportConfigId,
    reportConfig                 CHOICE {
        reportConfigNR               ReportConfigNR,
        ...,
        reportConfigInterRAT         ReportConfigInterRAT
    }
}
-- TAG-REPORTCON
```

In some implementations, a measurement ID (e.g., MeasId) may be used to link a measurement object to a report configuration. For example, each measurement ID may be associated with a measurement object ID (e.g., MeasObjectId) and a report configuration ID (e.g., Report-ConfigId). An example TP of the IE MeasIdToAddModList including the measurement ID is shown in Table 4.

TABLE 4

```
-- ASN1START
-- TAG-MEASIDTOADDMODLIST-START
MeasIdToAddModList ::=           SEQUENCE (SIZE
                                 (1..maxNrofMeasId))
                                 OF MeasIdToAddMod
MeasIdToAddMod ::=               SEQUENCE {
    measId                       MeasId,
    measObjectId                 MeasObjectId,
    reportConfigId               ReportConfigId
}
-- TAG-MEASIDTOADDMODLIST-STOP
-- ASN1STOP
```

In some implementations, a CHO command ID may be associated with a measurement ID and/or a measurement object ID. In some implementations, a CHO command ID may be associated with more than one measurement ID.

In some implementations, a CHO command ID may be included in a measurement object (or the corresponding measurement object configuration).

In some implementations, a CHO command ID may be included in a list of measurement IDs to be added and/or modified. For example, if a measurement ID is to be added and/or modified, the CHO command ID associated with the measurement ID may be present together with the measurement ID in the list to indicate to the UE the association between the measurement ID and the CHO command ID.

In some implementations, one or more measurement IDs may be included in a CHO command. It is noted that the term "CHO command" may be replaced by another term "CHO command configuration" or "conditional reconfiguration IE." That is, the term "CHO command," the term "CHO command configuration" and the term "conditional reconfiguration IE" may be exchangeable in some implementations of the present disclosure.

In some implementations, a measurement object (or the corresponding measurement object ID) may be included in a CHO command (or the corresponding CHO command configuration).

In some implementations, a CHO command ID may be associated with a (measurement) report configuration ID.

In some implementations, a CHO command ID may be included in a (measurement) report configuration.

In some implementations, a (measurement) report configuration (or the corresponding report configuration ID)

may be included in a CHO command (or the corresponding CHO command configuration).

Figure 1B:
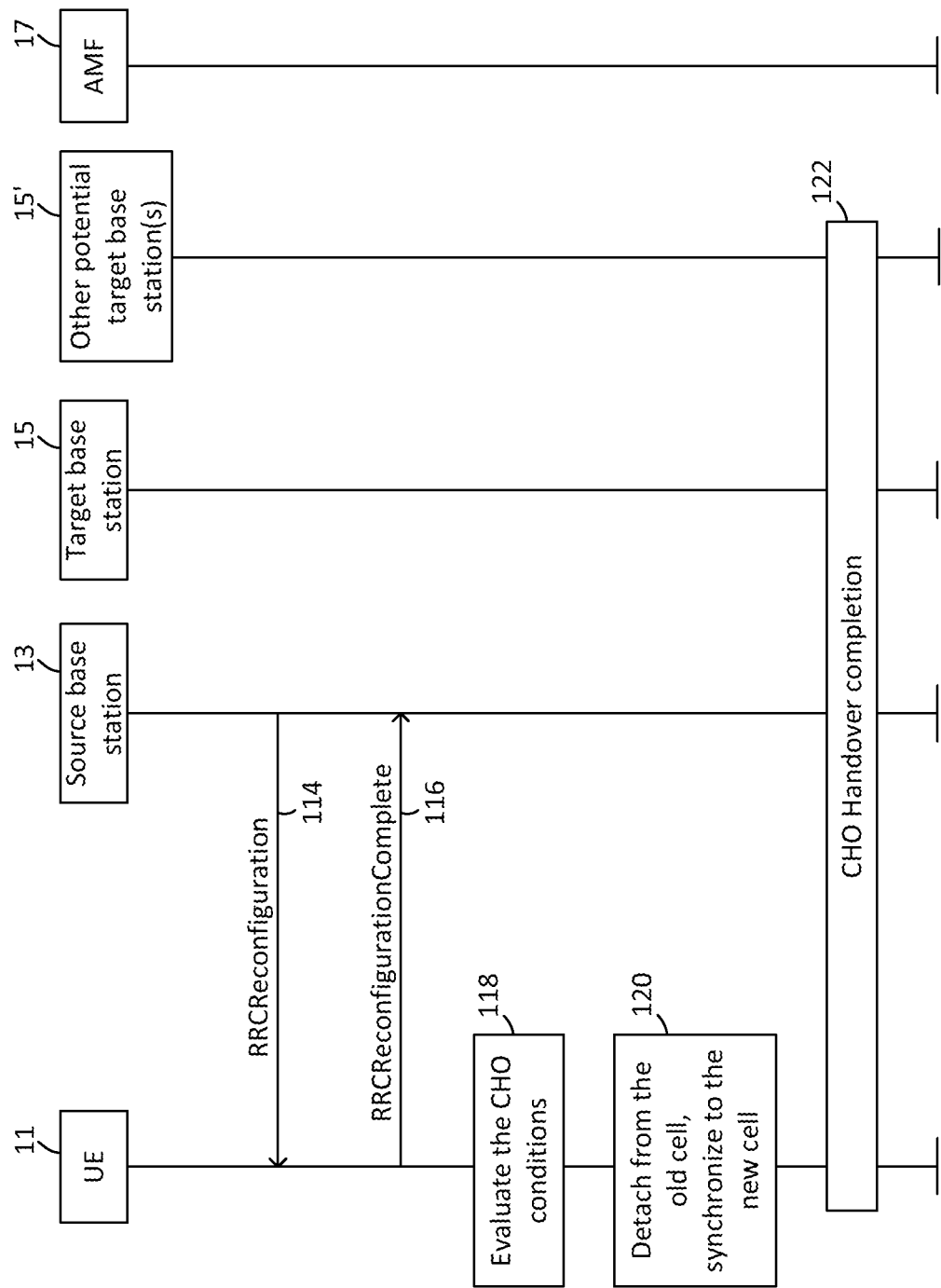
FIG. 1B is a diagram illustrating a CHO procedure, according to an implementation of the present disclosure.

FIG. 1A and FIG. 1B are diagrams illustrating a CHO procedure, according to an implementation of the present disclosure. It should be noted that although the source and target BSs in FIGS. 1A and 1B and the following figures are shown, and described, as gNBs, the source and target BSs may be any combination of other types of BSs in some of the present implementations. For example, any of the source and/or target BSs may be an eNB in some of the present implementations. That is, in some of the present implementations, source BS 13 may be an eNB, while target BS 15 (and/or other potential BS(s) 15') may be a gNB (or an eNB). Conversely, source BS 13 may be a gNB, while target BS 15 (and/or other potential BS(s) 15') may be an eNB (or a gNB).

As shown in FIG. 1A, in action 102, the UE context within source BS 13 may contain information (e.g., the mobility control information provided by Access and Mobility management Function (AMF) 17) regarding roaming and access restrictions which are provided either at connection establishment or at the last Tracking Area (TA) update.

In action 104, source BS 13 may configure UE 11 measurement procedures and UE 11 may report according to the measurement configuration.

In action 106, source BS 13 may decide to use CHO.

In actions 108 and 108', source BS 13 may transmit a handover request message (e.g., the HANDOVER REQUEST message) to one or more candidate target BSs (e.g., target BS 15 and/or other potential target BS(s) 15').

In actions 110 and 110', admission control may be performed by the candidate target BS(s) (e.g., target BS 15 and/or other potential target BS(s) 15'). Slice-aware admission control may be performed if the slice information is sent to the candidate target BS(s). If the Protocol Data Unit (PDU) sessions are associated with non-supported slices, the candidate target BS(s) may reject such PDU sessions.

In actions 112 and 112', the candidate target BS(s) (e.g., target BS 15 and/or other potential target BS(s) 15') may send a handover request acknowledge message (e.g., the HANDOVER REQUEST ACKNOWLEDGE message) including the configuration of the CHO candidate cell(s) to source BS 13.

Proceeding to FIG. 1B, in action 114, source BS 13 may send an RRC reconfiguration message (e.g., the RRCReconfiguration message) to UE 11. The RRC reconfiguration message may contain the configuration of the CHO candidate cell(s) and CHO execution condition(s) (or CHO trigger condition(s)).

In action 116, UE 11 may send an RRC reconfiguration complete message (e.g., the RRCReconfigurationComplete message) to source BS 13.

In action 118, UE 11 may maintain connection with source BS 13 after receiving the CHO configuration, and start evaluating the CHO execution conditions (or the CHO trigger conditions) for the candidate cell(s). In actions 120 and 122, if at least one CHO candidate cell satisfies the corresponding CHO execution condition (or the corresponding CHO trigger condition), UE 11 may detach from source BS 13, apply the stored corresponding configuration for that new cell (e.g., the selected candidate cell), and synchronize to that candidate cell and complete the RRC handover procedure (or CHO procedure) by sending an RRC reconfiguration complete message (e.g., the RRCReconfigurationComplete message) to the target BS (e.g., one of target BS 15 and other potential target BS(s) 15'). UE 11 may release the stored CHO configurations after the successful completion of the RRC handover procedure. Note that a CHO configuration may be configured with one or two trigger conditions.

In some implementations, a CHO command ID may be associated with a measurement ID. In some implementations, the target cell(s) of the CHO command may be listed in or indicated by the associated measurement object (or the corresponding measurement object configuration). For example, the target cell(s) indicated by the CHO command may be included in, but not limited to, the cell list (e.g., included in the IE cellsToAddModList) of the measurement object configuration.

In some implementations, the CHO command ID (e.g., the IE choCommandId) may be included in the list of measurement IDs to be added and/or modified (e.g., the IE MeasIdToAddModList). As shown in Table 5, if a measurement ID is to be added and/or modified, the associated CHO command ID together with this measurement ID (e.g., the MeasId) may be present in the IE MeasIdToAddModList to indicate the link between the measurement ID and the CHO command ID. In some implementations, the CHO command ID may be set to a default value if the measurement ID is not associated with a CHO command (or the corresponding CHO command ID). It is noted that the naming of each IE described herein may vary in some of the present implementations. For example, the IE choCommandId may be replaced by another IE named "CondConfigID" that can also be used to indicate or represent a CHO command ID.

TABLE 5

```
-- ASN1START
-- TAG-MEASIDTOADDMODLIST-START
MeasIdToAddModList ::=        SEQUENCE (SIZE
                              (1..maxNrofMeasId))
                              OF MeasIdToAddMod
MeasIdToAddMod ::=            SEQUENCE {
    measId                    MeasId,
    choCommandId              ChoCommandId,
    measObjectId              MeasObjectId,
    reportConfigId            ReportConfigId
}
-- TAG-MEASIDTOADDMODLIST-STOP
-- ASN1STOP
```

Figure 2:
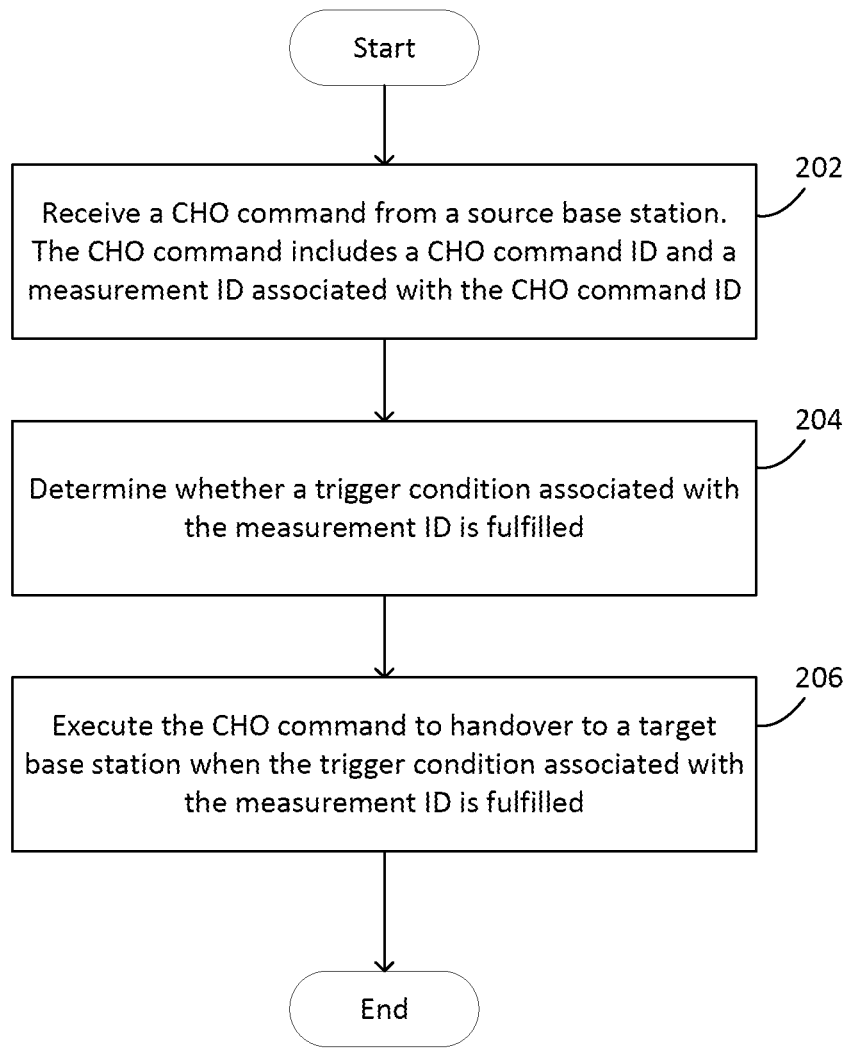
FIG. 2 is a diagram illustrating a flowchart of a CHO procedure, according to an implementation of the present disclosure.

FIG. 2 is a diagram illustrating a flowchart of a CHO procedure, according to an implementation of the present disclosure.

As shown in FIG. 2, in action 202, a UE may receive a CHO command (or a corresponding CHO command configuration, or a conditional reconfiguration IE) from a source BS. The CHO command (or the corresponding CHO command configuration, or the conditional reconfiguration IE) may include a CHO command ID and a measurement ID associated with the CHO command ID. Note that the association between the CHO command ID and the measurement ID may be based on any type of data linkage. For example, the CHO command ID (e.g., the IE choCommandId) and the associated measurement ID (e.g., the MeasId) may be included in the same IE (e.g., the IE MeasIdToAddMod as shown in Table 5) and/or included in the same addition/modification list of a CHO command (or the corresponding CHO command configuration, or the conditional reconfiguration IE).

In some implementations, a CHO command (or the corresponding CHO command configuration, or the conditional reconfiguration IE) may include a CHO command ID and more than one measurement ID associated with the CHO command ID.

In action 204, the UE may determine whether a trigger condition associated with the measurement ID is fulfilled. In some implementations, the trigger condition associated with the measurement ID may be a trigger condition that is configured/indicated in a report configuration that is associated with the measurement ID. For example, the UE may determine whether the trigger condition is fulfilled according to a measurement result obtained by measuring a cell-level Reference Signal (RS) or a beam-level RS. In some implementations, the cell-level RS may be an SSB and the beam-level RS may be a CSI-RS.

In some implementations, if more than one measurement ID is associated with the CHO command ID, the UE may determine whether all the trigger conditions associated with all the measurement ID are fulfilled.

In action 206, the UE may execute the CHO command (or initiate the execution of the CHO command) to handover to a target BS (e.g., indicated by the CHO command) when the trigger condition associated with the measurement ID is fulfilled. In some implementations, the UE may execute the CHO command (or initiate the execution of the CHO command) without reporting a measurement report (or measurement results) according to a report configuration associated with the measurement ID. For example, the UE may not report any measurement report to the BS when executing the CHO command, even if the UE has been configured with a report configuration associated with the measurement ID in the CHO command (or the corresponding CHO command configuration, or the conditional reconfiguration IE). Note that the association between the measurement ID and the report configuration may be based on any type of data linkage. For example, as shown in Tables 3 and 4 (or Tables 3 and 5), the report configuration (e.g., the IE reportConfig) may be associated with a report configuration ID (e.g., the reportConfigId) that is associated with a measurement ID (e.g., the measId) in the IE MeasIdToAddMod. In some implementations, the UE may execute the CHO command (or initiate the execution of the CHO command) to handover to a target BS (e.g., indicated by the CHO command) when the trigger conditions associated with all measurement IDs are fulfilled.

In some implementations, as shown in Table 6, a measurement configuration (e.g., the IE MeasConfig) may include at least one of a list of CHO objects to be added and/or modified (e.g., the IE choObjectToAddModList) and a list of CHO objects to be removed (e.g., the IE choObjectToRemoveList). A CHO object may be removed if the CHO object ID corresponding to this CHO object is present in the list of CHO objects to be removed.

Figure 3:
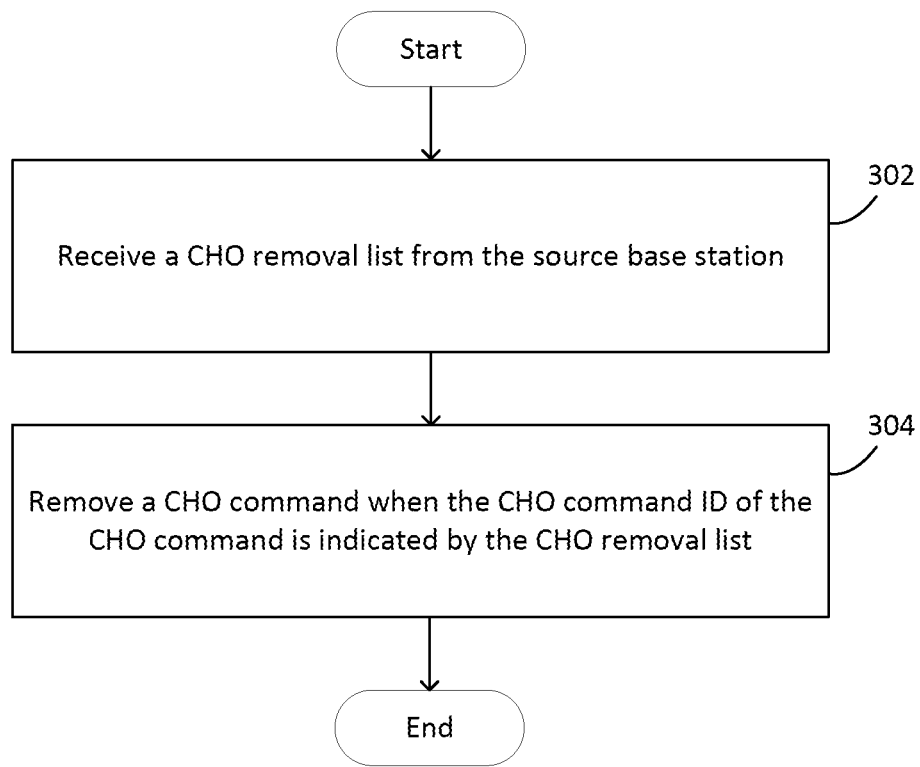
FIG. 3 is a diagram illustrating a flowchart of a CHO procedure, according to an implementation of the present disclosure.

FIG. 3 is a diagram illustrating a flowchart of a CHO procedure, according to an implementation of the present disclosure.

TABLE 6

```
-- ASN1START
-- TAG-MEASCONFIG-START
MeasConfig ::=                SEQUENCE {
    choObjectToRemoveList                            ChoObjectToRemoveList
OPTIONAL, -- Need N
    choObjectToAddModList                            ChoObjectToAddModList
OPTIONAL, -- Need N
    measObjectToRemoveList                           MeasObjectToRemoveList
OPTIONAL, -- Need N
    measObjectToAddModList                           MeasObjectToAddModList
OPTIONAL, -- Need N
    reportConfigToRemoveList                         ReportConfigToRemoveList
OPTIONAL, -- Need N
    reportConfigToAddModList                         ReportConfigToAddModList
OPTIONAL, -- Need N
    measIdToRemoveList                               MeasIdToRemoveList
OPTIONAL, -- Need N
    measIdToAddModList                               MeasIdToAddModList
OPTIONAL, -- Need N
    s-MeasureConfig           CHOICE {
        ssb-RSRP              RSRP-Range,
        csi-RSRP              RSRP-Range
    }
OPTIONAL, -- Need M
    quantityConfig                                   QuantityConfig
OPTIONAL, -- Need M
    measGapConfig                                    MeasGapConfig
OPTIONAL, -- Need M
    measGapSharingConfig      MeasGapSharingConfig            OPTIONAL, -- Need M
    ...
}
MeasObjectToRemoveList ::=    SEQUENCE (SIZE (1..maxNrofObjectId)) OF MeasObjectId
MeasIdToRemoveList ::=        SEQUENCE (SIZE (1..maxNrofMeasId)) OF MeasId
ReportConfigToRemoveList ::=  SEQUENCE (SIZE (1..maxReportConfigId)) OF
                              ReportConfigId
-- TAG-MEASCONFIG-STOP
```

As shown in FIG. 3, in action 302, a UE may receive a CHO removal list (e.g., the list of CHO objects to be removed from the UE, or IE choObjectToRemoveList) from the BS (e.g., the source BS). In some implementations, the CHO removal list may be included in an RRC message from the source BS.

In action 304, the UE may remove a CHO command at the UE when the CHO command ID of the CHO command is indicated by the CHO removal list.

Figure 4:
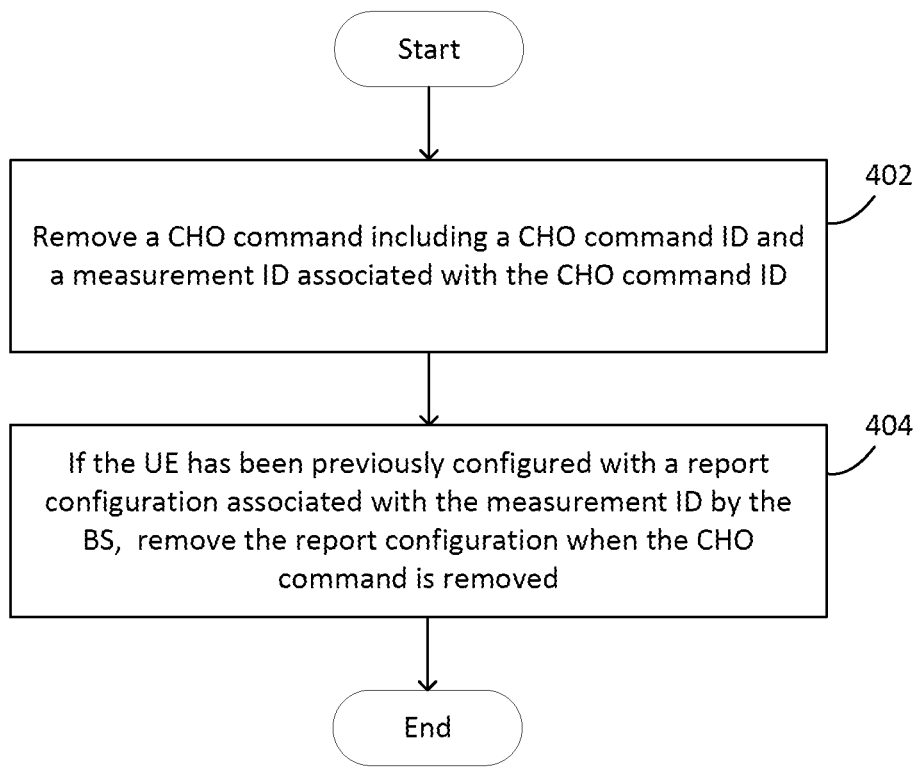
FIG. 4 is a diagram illustrating a flowchart of a CHO procedure, according to an implementation of the present disclosure.

FIG. 4 is a diagram illustrating a flowchart of a CHO procedure, according to an implementation of the present disclosure.

In action 402, a UE may remove a CHO command at the UE. The CHO command may include a CHO command ID and a measurement ID associated with the CHO command ID.

In action 404, if the UE has been previously configured with a report configuration associated with the measurement ID by the BS, the UE may remove the report configuration at the UE when the CHO command is removed.

Figure 5:
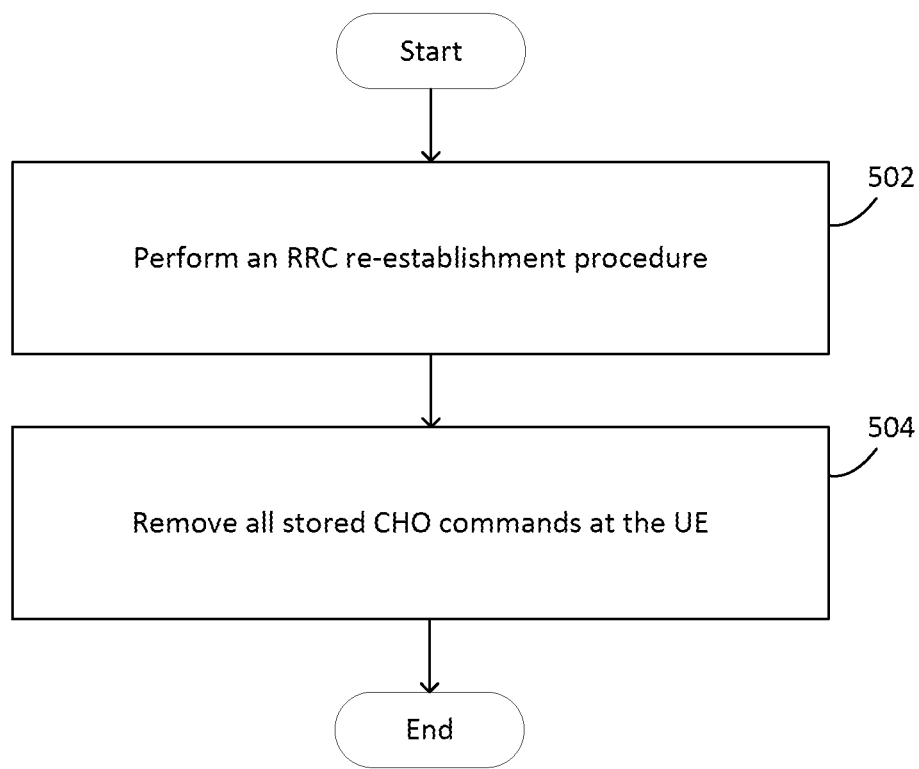
FIG. 5 is a diagram illustrating a flowchart of a CHO procedure, according to an implementation of the present disclosure.

FIG. 5 is a diagram illustrating a flowchart of a CHO procedure, according to an implementation of the present disclosure.

In action 502, a UE may perform an RRC re-establishment procedure.

In action 504, the UE may remove all stored CHO commands at the UE when the UE performs the RRC re-establishment procedure.

In some implementations, a CHO object (or a CHO object ID) may be used to link a measurement ID to a CHO command ID. An example TP of a CHO object configuration is shown in Table 7. The IE maxNrofChoObject may be referred to the maximum number of CHO objects that are allowed to be included in the list of CHO objects to be added and/or modified (e.g., the IE choObjectToAddModList).

TABLE 7

```
-- ASN1START
-- TAG-MEASIDTOADDMODLIST-START
ChoObjectToAddModList ::=     SEQUENCE (SIZE
                              (1..maxNrofChoObject)) OF
ChoObjectToAddMod
ChoObjectToAddMod ::=         SEQUENCE {
    choobjectId                  ChoObjectID,
    measId                       MeasId,
    chocommandId                 ChoCommandId
}
-- TAG-MEASIDTOADDMODLIST-STOP
-- ASN1STOP
```

In some implementations, when a trigger condition of a report configuration associated with a measurement ID is fulfilled, and if a CHO command ID included in the measurement configuration is associated with the measurement ID, the UE may execute the CHO command (e.g., indicated by the CHO command ID), but may not report the measurement results to the BS. In some other implementations, the UE may report measurement results to the BS if the UE executes the CHO command. In some other implementations, if the UE executes the CHO command, the UE may determine whether to report the measurement results to the BS based on NW instructions or configurations. In some implementations, a reporting indicator may be used to indicate to the UE whether the measurement results are needed to be reported when the measurement reporting procedure is triggered (or when the trigger condition of a report configuration is fulfilled) and results in the execution/release of the CHO command. The reporting indicator may be included in the measurement configuration, the associated (measurement) report configuration, or the associated measurement object configuration.

In some implementations, when a trigger condition of a report configuration associated with a measurement ID is fulfilled, and if a CHO command ID included in the measurement configuration is associated with the measurement ID, the UE may report measurement results to the BS, and may not execute the CHO command. In some other implementations, if the UE reports the measurement results to the BS, the UE may execute the CHO command. In some other implementations, if the UE reports the measurement results to the BS, the UE may determine whether to execute the CHO command based on the NW instructions or configurations. For example, a CHO execution indicator may be included in an RRC message (e.g., RRC reconfiguration message) to indicate to the UE whether the CHO command needs to be executed.

In some implementations, when a leaving condition of a report configuration associated with a measurement ID is fulfilled, and if a CHO command ID included in the measurement configuration is associated with the measurement ID, the UE may remove the CHO command, and may not report the measurement results to the BS. In some other implementations, the UE may report the measurement results to the BS if the UE releases the CHO command. In some other implementations, if the UE releases the CHO command, the UE may determine whether to report the measurement results to the BS based on the NW instructions or configurations (e.g., based on whether the IE reportOnLeave is set or not). In some implementations, after removing a CHO command, the UE may notify the NW that the CHO command has been removed (e.g., by reporting the CHO command ID of the released CHO command to the NW).

In some implementations, when a leaving condition of a report configuration associated with a measurement ID is fulfilled, and if a CHO command ID included in the measurement configuration is associated with the measurement ID, the UE may report the measurement results to the BS and may not remove the CHO command. In some other implementations, the UE may remove the CHO command if the UE reports the measurement results to the BS. In some other implementations, if the UE reports the measurement results to the BS, the UE may determine whether to remove the CHO command based on the NW instructions or configurations. For example, a CHO remove indicator may be included in an RRC message (e.g., RRC reconfiguration message) to indicate to the UE whether the CHO command needs to be removed.

In some implementations, when a trigger condition of a report configuration associated with a measurement ID is fulfilled, and if the measurement ID is included in a CHO command, the UE may execute the CHO command (or initiate the execution of the CHO command), and may not report the measurement results to the BS. In some implementations, when all trigger conditions associated with all associated measurement IDs are fulfilled, and if all the associated measurement IDs are included in a CHO command, the UE may execute the CHO command (or initiate the execution of the CHO command), and may not report the measurement results to the BS. The one or more measurement IDs included in the CHO command may be associated with the CHO command ID of the CHO command. In some other implementations, the UE may report the measurement results to the BS if the UE executes the CHO command. In some other implementations, the UE may determine whether to report the measurement results to the BS based on the NW instructions or configurations (e.g., based on a reporting indicator).

In some implementations, when a trigger condition of a report configuration associated with a measurement ID is fulfilled, and if the measurement ID is included in a CHO command, the UE may report the measurement results to the BS and may not execute the CHO command. In some other implementations, if the UE reports the measurement results to the BS, the UE may also execute the CHO command based on the NW instructions or configurations (e.g., based on the CHO execution indicator).

In some implementations, when a leaving condition of a report configuration associated with a measurement ID is fulfilled, and if the measurement ID is included in a CHO command, the UE may release the CHO command, and may not report the measurement results to the BS. In some other implementations, if the UE releases the CHO command, the UE may report the measurement results to the BS. In some other implementations, if the UE releases the CHO command, the UE may determine whether to report the corresponding measurement results based on the NW instructions or configurations (e.g., based on whether the IE reportOnLeave is set or not, and/or based on the reporting indicator).

In some implementations, when a leaving condition of a report configuration associated with a measurement ID is fulfilled, and if the measurement ID is included in a CHO command, the UE may report the measurement results to the BS and may not release the CHO command. In some other implementations, if the UE reports the measurement results to the BS, the UE may release the CHO command. In some other implementations, if the UE reports the measurement results to the BS, the UE may determine whether to release the CHO command based on the NW instructions or configurations (e.g., based on the CHO release indicator).

In some implementations, a CHO command ID may be included in a measurement object (or the corresponding measurement object configuration). The measurement object may belong to NR or EUTRA. In some implementations, a CHO command ID may be included in a (measurement) report configuration. The report configuration may belong to NR or EUTRA and specify the trigger condition of an NR measurement reporting event. Different measurement events may be included in a report configuration. For example, these measurement events may include events A1, A2, A3, A4, A5, and A6 as listed below. For example, these measurement events may include B1 and B2 as listed below. The measurement reporting events may be determined based on the cell measurement results. Examples of the definitions of the measurement events are listed below:

Event A1: Serving becomes better than absolute threshold;

Event A2: Serving becomes worse than absolute threshold;

Event A3: Neighbor becomes amount of offset better than Primary Cell (PCell)/Primary Second Cell (PSCell);

Event A4: Neighbor becomes better than absolute threshold;

Event A5: PCell/PSCell becomes worse than absolute threshold1 AND neighbor/Secondary Cell (SCell) becomes better than another absolute threshold2;

Event A6: Neighbor becomes amount of offset better than SCell.

Event B1: Inter RAT neighbor becomes better than threshold;

Event B2: PCell becomes worse than threshold1 and inter RAT neighbor becomes better than threshold2.

An example TP of an NR report configuration including a CHO command ID is shown in Table 8. In another example, the CHO command ID may be included in an event trigger configuration.

TABLE 8

```
ReportConfigNR ::=            SEQUENCE {
  reportType                    CHOICE {
  periodical                      PeriodicalReportConfig,
  eventTriggered                  EventTriggerConfig,
  ...,
  reportCGI                       ReportCGI
  }
}
ReportCGI ::=                 SEQUENCE {
  cellForWhichToReportCGI       PhysCellId,
  ...
}
EventTriggerConfig::=         SEQUENCE {
  eventId                       CHOICE {
  eventA1                         SEQUENCE {
    a1-Threshold                    MeasTriggerQuantity,
    reportOnLeave                   BOOLEAN,
    hysteresis                      Hysteresis,
    timeToTrigger                   TimeToTrigger
  },
  eventA2                         SEQUENCE {
    a2-Threshold                    MeasTriggerQuantity,
    reportOnLeave                   BOOLEAN,
    hysteresis                      Hysteresis,
    timeToTrigger                   TimeToTrigger
  },
  eventA3                         SEQUENCE {
    a3-Offset                       MeasTriggerQuantityOffset,
    reportOnLeave                   BOOLEAN,
    hysteresis                      Hysteresis,
    timeToTrigger                   TimeToTrigger,
    useWhiteCellList                BOOLEAN
  },
  eventA4                         SEQUENCE {
    a4-Threshold                    MeasTriggerQuantity,
    reportOnLeave                   BOOLEAN,
    hysteresis                      Hysteresis,
    timeToTrigger                   TimeToTrigger,
    useWhiteCellList                BOOLEAN
  },
```

TABLE 8-continued

```
   eventA5                        SEQUENCE {
      a5-Threshold1                  MeasTriggerQuantity,
      a5-Threshold2                  MeasTriggerQuantity,
      reportOnLeave                  BOOLEAN,
      hysteresis                     Hysteresis,
      timeToTrigger                  TimeToTrigger,
      useWhiteCellList               BOOLEAN
   },
   eventA6                        SEQUENCE {
      a6-Offset                      MeasTriggerQuantityOffset,
      reportOnLeave                  BOOLEAN,
      hysteresis                     Hysteresis,
      timeToTrigger                  TimeToTrigger,
      useWhiteCellList               BOOLEAN
   },
   ...
   },
   chocommandId                   ChoCommandId                       OPTIONAL,
   rsType                         NR-RS-Type,
   reportInterval                 ReportInterval,
   reportAmount                   ENUMERATED {r1, r2, r4, r8, r16, r32, r64, infinity},
   reportQuantityCell             MeasReportQuantity,
   maxReportCells                 INTEGER (1..maxCellReport),
   reportQuantityRS-Indexes           MeasReportQuantity             OPTIONAL, -- Need R
   maxNrofRS-IndexesToReport      INTEGER (1..maxNrofIndexesToReport)   OPTIONAL, --
Need R
   includeBeamMeasurements            BOOLEAN,
   reportAddNeighMeas             ENUMERATED {setup}                 OPTIONAL, -- Need R
   ...
}
PeriodicalReportConfig ::=        SEQUENCE {
   rsType                         NR-RS-Type,
   reportInterval                 ReportInterval,
   reportAmount                   ENUMERATED {r1, r2, r4, r8, r16, r32, r64, infinity},
   reportQuantityCell             MeasReportQuantity,
   maxReportCells                 INTEGER (1..maxCellReport),
   reportQuantityRS-Indexes           MeasReportQuantity             OPTIONAL, -- Need R
   maxNrofRS-IndexesToReport      INTEGER (1..maxNrofIndexesToReport)   OPTIONAL, --
Need R
   includeBeamMeasurements            BOOLEAN,
   useWhiteCellList                   BOOLEAN,
   ...
}
NR-RS-Type ::=                    ENUMERATED {ssb, csi-rs}
MeasTriggerQuantity ::=           CHOICE {
   rsrp                           RSRP-Range,
   rsrq                           RSRQ-Range,
   sinr                           SINR-Range
}
MeasTriggerQuantityOffset ::=     CHOICE {
   rsrp                           INTEGER (-30..30),
   rsrq                           INTEGER (-30..30),
   sinr                           INTEGER (-30..30)
}
MeasReportQuantity ::=            SEQUENCE {
   rsrp                           BOOLEAN,
   rsrq                           BOOLEAN,
   sinr                           BOOLEAN
}
-- TAG-REPORTCONFIGNR-STOP
-- ASN1STOP
```

In some implementations, when a trigger condition of a report configuration associated with a measurement ID is fulfilled, and if a CHO command ID is included in the (measurement) report configuration, the UE may execute the CHO command (e.g., indicated by the CHO command ID), and may not report the measurement results to the BS. In some other implementations, the UE may report measurement results to the BS if the UE executes the CHO command. In some other implementations, if the UE executes the CHO command, the UE may determine whether to report the measurement results to the BS based on NW instructions or configurations (e.g., based on the reporting indicator).

In some implementations, when a trigger condition of a report configuration associated with a measurement ID is fulfilled, and if a CHO command ID is included in the (measurement) report configuration, the UE may report measurement results to the BS, and may not execute the CHO command. In some other implementations, if the UE reports the measurement results to the BS, the UE may execute the CHO command. In some other implementations, if the UE reports the measurement results to the BS, the UE may determine whether to execute the CHO command based on the NW instructions or configurations (e.g., the CHO execution indicator).

In some implementations, when a leaving condition of a report configuration associated with a measurement ID is fulfilled, and if a CHO command ID is included in the (measurement) report configuration, the UE may release the CHO command, and may not report the measurement results to the BS. In some other implementations, if the UE releases the CHO command, the UE may report the measurement results to the BS. In some other implementations, if the UE releases the CHO command, the UE may determine whether to report the corresponding measurement results based on the NW instructions or configurations (e.g., based on whether the IE reportOnLeave is set or not, and/or based on the reporting indicator).

In some implementations, when a leaving condition of a report configuration associated with a measurement ID is fulfilled, and if a CHO command ID is included in the (measurement) report configuration, the UE may report the measurement results to the BS and may not release the CHO command. In some other implementations, the UE may release the CHO command if the UE reports the measurement results to the BS. In some other implementations, if the UE reports the measurement results to the BS, the UE may determine whether to release the CHO command based on the NW instructions or configurations (e.g., the CHO release indicator).

In some implementations, when a trigger condition of a report configuration associated with a measurement ID is fulfilled, and if the associated report configuration (or the corresponding report configuration ID) of the measurement ID is included in a CHO command, the UE may execute the CHO command (e.g., indicated by the CHO command ID), and may not report the measurement results to the BS. In some other implementations, the UE may report measurement results to the BS if the UE executes the CHO command. In some other implementations, if the UE executes the CHO command, the UE may determine whether to report the measurement results to the BS based on the NW instructions or configurations (e.g., based on the reporting indicator).

In some implementations, when a trigger condition of a report configuration associated with a measurement ID is fulfilled, and if the associated report configuration (or the corresponding report configuration ID) of the measurement ID is included in a CHO command, the UE may report measurement results to the BS, and may not execute the CHO command. In some other implementations, if the UE reports the measurement results to the BS, the UE may execute the CHO command. In some other implementations, if the UE reports the measurement results to the BS, the UE may determine whether to execute the CHO command based on the NW instructions or configurations (e.g., the CHO execution indicator).

In some implementations, when a leaving condition of a report configuration associated with a measurement ID is fulfilled, and if the associated report configuration (or the corresponding report configuration ID) of the measurement ID is included in a CHO command, the UE may release the CHO command, and may not report the measurement results to the BS. In some other implementations, if the UE releases the CHO command, the UE may report the measurement results to the BS. In some other implementations, if the UE releases the CHO command, the UE may determine whether to report the corresponding measurement results based on the NW instructions or configurations (e.g., based on whether the IE reportOnLeave is set or not, and/or based on the reporting indicator).

In some implementations, when a leaving condition of a report configuration associated with a measurement ID is fulfilled, and if the associated report configuration (or the corresponding report configuration ID) of the measurement ID is included in a CHO command, the UE may report the measurement results to the BS and may not release the CHO command. In some other implementations, the UE may release the CHO command if the UE reports the measurement results to the BS. In some other implementations, if the UE reports the measurement results to the BS, the UE may determine whether to release the CHO command based on the NW instructions or configurations (e.g., the CHO release indicator).

In some implementations, at least one of the CHO command, the measurement configuration, the measurement object, or the (measurement) report configuration may be modified or removed by the BS. For example, if a CHO command is removed by the BS or by the UE autonomously, the measurement configuration/measurement ID/measurement object/report configuration associated with the CHO command may need to be updated or removed accordingly to avoid unnecessary measurements by the UE.

In some implementations, the NW may guarantee that when a CHO command is removed by the NW, the measurement configuration associated with the CHO command may be modified by the NW accordingly. For example, when a CHO command is removed, there may be no CHO command ID of the CHO command in any measurement configuration.

In some implementations, the NW may guarantee that when a measurement ID is removed, the CHO command associated with the measurement ID may be modified accordingly. For example, when a measurement ID is removed, the measurement ID may not be included in any CHO command.

In some implementations, the NW may guarantee that when a CHO command is removed, the measurement object associated with the CHO command may be modified accordingly. For example, when a CHO command is removed, there may be no CHO command ID of the CHO command in any measurement object configuration.

In some implementations, the NW may guarantee that when a measurement object ID is removed, the CHO command associated with the measurement object ID may be modified accordingly. For example, when a measurement object ID is removed, the measurement object ID may not be included in any CHO command.

In some implementations, the NW may guarantee that when a CHO command is removed, the measurement report configuration associated with the CHO command may be modified accordingly. For example, when a CHO command is removed, there may be no CHO command ID of the CHO command in any measurement report configuration.

In some implementations, the NW may guarantee that when an object configuration ID is removed, the CHO command associated with the object configuration ID may be modified accordingly. For example, when a report configuration ID is removed, the report configuration ID may not be included in any CHO command.

In some implementations, the UE may autonomously remove a measurement configuration associated with a CHO command when the CHO command is removed.

In some implementations, the UE may autonomously remove a CHO command associated with a measurement configuration if the measurement configuration is removed.

In some implementations, the UE may autonomously remove a measurement object associated with a CHO command when the CHO command is removed.

In some implementations, the UE may autonomously remove a CHO command associated with a measurement object if the measurement object is removed.

In some implementations, the UE may autonomously remove a measurement report configuration associated with a CHO command when the CHO command is removed.

In some implementations, the UE may autonomously remove a CHO command associated with a measurement report configuration if the measurement report configuration is removed.

As disclosed below, methods to deal with the collision and/or failure of CHO execution are provided in some implementations of the present disclosure.

In some implementations, a UE may determine whether to invalidate or release a CHO command and/or a radio resource associated with the CHO command based on a leaving condition. For example, when the UE finds that the leaving condition is fulfilled (e.g., the target cell signal quality is below a predefined threshold within a time period), the UE may consider that the corresponding CHO command is invalid, and the UE may release radio resources associated with the CHO command accordingly. In some implementations, if the trigger condition of one CHO command is fulfilled, other CHO commands stored at the UE may be considered to be invalid. If the CHO command is considered to be invalid, the UE may not evaluate whether the trigger condition(s) and/or leaving condition(s) associated with this CHO command is fulfilled or not. In some implementations, if the trigger condition of a CHO command is fulfilled, other stored CHO commands may be released.

In some implementations, if the leaving condition of the CHO command is fulfilled or a timer related to a CHO command expires, the CHO command may become invalid and may be released by the UE. In some other implementations, if the leaving condition of the CHO command is fulfilled or a timer related to a CHO command expires, the CHO command may become invalid but not be released by the UE. For example, when a CHO command becomes invalid, the UE may still store this CHO command, but the UE may not evaluate the trigger condition(s) and/or leaving condition(s) associated with this CHO command. In some implementations, when a CHO command becomes invalid, the UE may still store the CHO command, but the UE may not use the resource allocation/configuration of the CHO command. In some implementations, an invalid CHO command may become active again if the source BS reconfigures this CHO command (e.g., by assigning new random access (RA) resources for this CHO command) or activates this CHO command again (e.g., by transmitting an RRC message or a Medium Access Control (MAC) Control Element (CE) to the UE).

In some implementations, a timer may be included in a CHO command to indicate a time period during which a corresponding CHO command remains valid. If the timer is included in the CHO command, the UE may consider the CHO command to be valid until the timer expires. The timer may start when the UE receives the corresponding CHO command. In some implementations, the timer and the leaving condition may coexist. For example, if the leaving condition of a CHO command is fulfilled but the timer is still running, the CHO command may be considered to be invalid and released. Each CHO command may be associated with a specific timer, and the timers in the CHO commands may be running independently. If a CHO command does not include a timer or the value of the timer is set to infinite, the CHO command may always be valid until the handover procedure is performed (e.g., the CHO command may be released after the handover procedure).

In some implementations, each target cell indicated by a CHO command may be configured with a specific timer. For example, if a CHO command indicates two target cells (e.g., cell #1 and cell #2), two timers (e.g., life timer T1 and life timer T2) may be included in the CHO command to respectively indicate the time periods during which cell #1 and cell #2 are valid. If the timer for a target cell indicated by a CHO command is present, the UE may consider this target cell to be valid until the timer expires. If the target cell is considered to be valid, the UE may choose to connect to the target cell if an associated trigger condition is fulfilled. In some implementations, the CHO command may be released if all the indicated target cell(s) are considered to be invalid (e.g., the life timer of each target cell expires).

In some implementations, for a CHO command including a timer, if the CHO command is not successfully executed, the timer may restart. In some implementation, if the timer in the CHO command restarts due to an execution failure of the CHO command, the UE may report the execution failure to the NW. In some implementations, for a CHO command including a timer, if the CHO command is not successfully executed, the timer may be shortened. In such a case, the timer may be shortened based on NW configurations and/or pre-defined rules. For example, the UE may select a random value from a pre-defined/pre-configured range and shorten the timer based on the selected random value. If the timer is shortened to 0 or a negative value, the associated CHO command may be considered to be invalid.

In some implementations, for a target cell of a CHO command including a timer, if the UE does not execute the CHO command successfully to connect to the target cell, the timer included in the CHO command may restart or be shortened (e.g., based on NW configurations and/or pre-defined rules).

1. Handling the Collision of a Triggered CHO Command and the Instruction from Base Station to Remove the Triggered CHO Command Approach 1-1

In some implementations, when a UE executes a CHO command (e.g., when a triggering condition of the CHO command is fulfilled), the BS may transmit a removal command (or a reconfiguration message) to remove this CHO command (e.g., due to the heavy load of the target cell of the CHO command) and the UE may ignore/suspend the removal command (or the reconfiguration message) if the UE receives the command (or the reconfiguration message) from the BS. That is, the UE may continue the execution of the CHO command regardless of the reception of the removal command (or reconfiguration message) from the BS. In some implementations, in a case that the UE ignores/suspends the removal command (or the reconfiguration message), the UE may release all the stored CHO commands if the CHO command is successfully executed. In some implementations, the source BS may receive a notification message from a new target BS, so that the source BS may realize that the previous removal command may be ignored/suspended or is not received by the UE. In some implementations, in a case that the UE ignores/suspends the removal command (or the reconfiguration message), the CHO command may be removed by the UE if the CHO command is not successfully executed. In some implementations, in a case that the UE ignores/suspends the removal command (or the reconfiguration message), the UE may release all the stored CHO commands if the CHO command is not successfully executed and a reestablishment procedure is triggered.

In some implementations, the removal command (or reconfiguration message) may be used to remove a target cell indicated in a CHO command (e.g., due to the heavy load of the target cell of the CHO command). For example, when a UE executes a CHO command to connect to a target cell (e.g., when a trigger condition of the CHO command is fulfilled), the BS may transmit a removal command (or the reconfiguration message) the UE to remove this target cell of this CHO command (e.g., due to the heavy load of the target cell of the CHO command). In some implementations, the UE may ignore/suspend a removal command (or reconfiguration message) after the UE receives the removal command (or the reconfiguration message). In some implementations, in a case that the UE ignores/suspends the removal command (or a reconfiguration message), the UE may release all the stored CHO commands if the CHO command for the target cell is successfully executed. In some implementations, the source BS may receive a notification message from a new target BS so that the source BS may realize that the previous removal command may be ignored/suspended or is not received by the UE. In some implementations, in a case that the UE ignores/suspends the removal command (or the reconfiguration message) that instructs the UE to remove a target cell indicated in the CHO command, the indicated target cell may still be removed by the UE if the CHO command is not successfully executed. In some implementations, in a case that the UE ignores/suspends the removal command (or reconfiguration message) that instructs the UE to remove a target cell indicated in the CHO command, the UE may release all the stored CHO commands if the CHO command is not successfully executed and a reestablishment procedure is triggered.

Approach 1-2

In some implementations, when a UE executes a CHO command (e.g., when a trigger condition of the CHO command is fulfilled), the BS may transmit a removal command (or a reconfiguration message) to remove this CHO command (e.g., due to the heavy load of the target cell of the CHO command) and the UE may terminate/suspend an ongoing CHO procedure upon the reception of the removal command (or reconfiguration message). In some implementations, in a case that the UE terminates/suspends an ongoing CHO procedure according to a removal command (or a reconfiguration message) that instructs the UE to remove a CHO command, the UE may inform the source BS (and/or the target BS) that the CHO command has been triggered before the removal command (or reconfiguration message) is received and the associated CHO procedure is terminated/suspended. In some implementations, in a case that the UE suspends an ongoing CHO procedure according to the removal command (or reconfiguration message), the UE may inform the source BS that the CHO command has been triggered before the removal command (or reconfiguration message) is received and may wait for a further command from the BS to determine whether to terminate the ongoing CHO procedure. For example, the UE may not immediately remove the CHO command but may wait for the further command from the BS to determine whether to terminate the ongoing CHO procedure. If the further command instructs the UE to terminate the ongoing CHO procedure, the associated CHO command may be removed. Conversely, if the further command instructs the UE not to terminate the ongoing CHO procedure, the UE may not remove the associated CHO command.

In some implementations, when a UE executes a CHO command to connect to a target cell (e.g., when a trigger condition of the CHO command is fulfilled), the BS may transmit a removal command (or a reconfiguration message) to remove the target cell of this CHO command (e.g., due to the heavy load of the target cell of the CHO command). The UE may terminate/suspend the ongoing CHO procedure when receiving the removal command (or reconfiguration message) from the BS. In some implementations, in a case that the UE terminates/suspends the ongoing CHO procedure according to the removal command (or the reconfiguration message), the UE may inform the source BS (and/or the target BS) that the CHO command has been triggered before the removal command (or reconfiguration message) is received and the associated CHO procedure is terminated/suspended. In some implementations, in a case that the UE terminates/suspends the ongoing CHO procedure according to the removal command (or the reconfiguration message), the UE may inform the source BS (and/or the target BS) that the CHO command has been triggered before the removal command (or reconfiguration message) is received and may wait for a further command from the BS to determine whether to terminate the ongoing CHO procedure. For example, the UE may not immediately remove the target cell of the CHO command but may wait for the further command from the BS to determine whether to terminate the ongoing CHO procedure. If the further command instructs the UE to terminate the ongoing CHO procedure, the target cell of the associated CHO command may be removed. If the further command instructs the UE not to terminate the ongoing CHO procedure, then the associated CHO command may not be removed.

Approach 1-3

In some implementations, when a UE executes a CHO command (e.g., when a trigger condition of the CHO command is fulfilled), the BS may transmit a removal command (or a reconfiguration message) to remove this CHO command (or to remove the target cell of this CHO command) and it may be up to UE implementation to decide whether to ignore/suspend the removal command (or the reconfiguration message) if the UE receives the removal command (or the reconfiguration message) from the BS. For example, in a case that the UE decides to ignore/suspend the removal command (or the reconfiguration message), the UE may take actions/operations in described in Approach #1-1. In a case that the UE decides not to ignore/suspend the removal command (or the reconfiguration message), the UE may take actions/operations described in Approach #1-2.

Approach 1-4

In some implementations, if a UE does not receive an NW confirmation for executing a CHO command (e.g., not receiving an acknowledge of executing a CHO command from the source BS), the UE may not be allowed to execute the CHO command even if the associated trigger condition of the CHO command is fulfilled. In some implementations, when a trigger condition of a CHO command is fulfilled, the UE may send a CHO command execution request to the source BS and start a timer T3. If the UE does not receive any response (e.g., acknowledgment or negative acknowledgment) from the source BS until the timer T3 expires, the UE may execute the CHO command if the associated trigger condition is still fulfilled. In some implementations, if the UE receives a response (e.g., acknowledgment or negative acknowledgment) from the BS when the timer T3 is running, the timer T3 may stop.

2. Handling a CHO Command in Failure Cases

Figure 6:
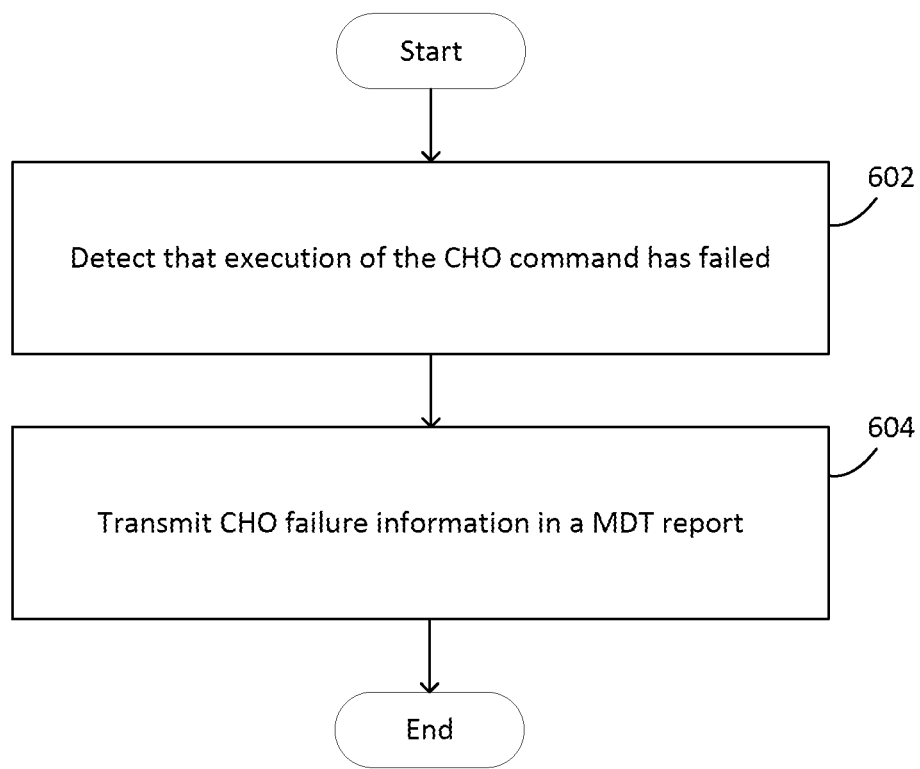
FIG. 6 is a diagram illustrating a flowchart of a CHO procedure, according to an implementation of the present disclosure.

In some implementations, the UE may report CHO failure information to the BS in a Minimization of Drive Tests (MDT) report (e.g., an immediate MDT Report), as shown in FIG. 6.

FIG. 6 is a diagram illustrating a flowchart of a CHO procedure, according to an implementation of the present disclosure. In action 602, a UE may detect that execution of the CHO command has failed. In action 604, the UE may transmit CHO failure information in an MDT report when the execution of the CHO command has failed.

In some implementations, the CHO failure information in the MDT report may include at least one of the following: an ID of a failed CHO command, a configuration related to the failed CHO command (e.g., a target cell configuration), a cause value indicating a CHO failure event, an ID of a failed target cell, an ID of a failed target BS, or a latest measurement result.

In some implementations, the CHO failure information may include at least one of the following: the ID of a failed CHO command, the configuration related to the failed CHO command, the cause of CHO failure, the failed target cell ID, the failed target BS ID, or the latest measurement results. In some implementations, the CHO failure information may include more than one ID of a failed CHO command. In some implementations, the CHO failure information may include more than one failed target cell ID. In some implementations, once the CHO failure information has been reported to the BS, the UE may release this CHO failure information.

Approach 2-1

In some implementations, a UE may release a triggered CHO command (e.g., a trigger condition of a target cell included in the CHO command is fulfilled) if the triggered CHO command cannot be successfully executed (e.g., random access to connect the target cell fails or CHO procedure fails due to the expiration of a CHO timer). For example, if the UE is allowed to try to access another cell which satisfies an associated trigger condition without the need to initiate an RRC reestablishment procedure, the UE may not have the second chance to re-execute the CHO command which is not successfully executed. If there is no other target cell for which an associated trigger condition is fulfilled, the UE may initiate the RRC reestablishment procedure.

Approach 2-2

In some other implementations, a UE may not release a triggered CHO command even if the triggered CHO command cannot be successfully executed. For example, if the UE is allowed to try to access another cell which satisfies an associated trigger condition without the need to initiate an RRC reestablishment procedure, the UE may have the chance to re-execute the CHO command which is not successfully executed. If there is no other target cell for which an associated trigger condition is fulfilled, the UE may initiate the RRC reestablishment procedure.

Approach 2-3

In some implementations, a UE may determine whether to release a triggered CHO command based on NW configurations, if the CHO command cannot be successfully executed. For example, the NW (or the BS) may configure the UE to keep/release a CHO command when the CHO command fails to be successfully executed. In some implementations, if the number of failed executions of a CHO command exceeds a threshold, the UE may release the CHO command. The threshold may be pre-defined or pre-configured by the NW (e.g., via dedicated signaling or system information broadcast by the NW).

Approach 2-4

In some implementations, if a reestablishment procedure is performed by a UE, the UE may release all the stored CHO commands. For example, if a CHO command is not successfully executed and the re-establishment procedure is performed by the UE, the UE may release all the stored CHO commands. In some implementations, if the UE performs a reestablishment procedure for a target cell that is indicated in a CHO command, the UE may keep the stored CHO command (for the target cell).

3. Handling the Collision of a Triggered CHO Command and the Associated Removal Conditions Approach 3-1

In some implementations, a UE may start a timer when receiving a CHO command including the timer. The UE may stop the timer when the CHO command is executed (e.g., because an associated trigger condition of this CHO command is fulfilled). In such a case, if the CHO command is not successfully executed, the UE may release the CHO command, restart the timer, remove the target cell in the CHO command, or restart the timer of the target cell.

Approach 3-2

In some implementations, a UE may start a timer when receiving a CHO command including the timer. If the CHO command is executed (and the corresponding CHO procedure is still ongoing) and the timer expires, the UE may not release the CHO command immediately. In such a case, if the CHO command is not successfully executed, the UE may release the CHO command.

In some implementations, when receiving a CHO command including a timer for a target cell, the UE may start the timer. If the UE executes the CHO command to connect to the target cell (and the corresponding CHO procedure is still ongoing) and the timer of the target cell expires, the UE may not release the CHO command immediately. In such a case, if the UE does not successfully execute the CHO command to connect to the target cell, the UE may remove the target cell in the CHO command.

Approach 3-3

In some implementations, a UE may not release a CHO command if the leaving condition included in the CHO command is fulfilled and the CHO command is executed (and the corresponding CHO procedure is still ongoing). In some implementations, the UE may not perform measurements for a leaving condition of a CHO command when the CHO command is executed and the corresponding CHO procedure is still ongoing. The UE may resume the measurements for the leaving condition of the CHO command if the CHO command is not executed and is still valid. In some implementations, the UE may ignore the triggering of a leaving condition of a CHO command that is executed. The leaving condition may be re-triggered by the UE when the CHO command is not executed and is still valid.

Approach 3-4

In some implementations, a UE may release a CHO command if the leaving condition included in the CHO command is fulfilled, the CHO command is executed, and the corresponding CHO procedure is still ongoing. In such a case, the corresponding CHO procedure may be terminated by the UE.

4. Handling Multiple Target Cells Associated with the Same CHO Command when the Associated Trigger Conditions are Fulfilled Simultaneously Approach 4-1

In some implementations, the target cell indicated in a CHO command may be configured with a cell priority. An example TP of the CHO command is as shown in Table 9. The IE choCommandId may be referred to as a CHO command ID that is associated with a CHO command. The IE targetCelltoAddModList may be referred to as a list of target cells to be added and/or modified in a CHO command. The IE targetCelltoRemoveList may be referred to as a list of target cells to be removed from a CHO command. The IE maxNrofTargetcell may be referred to as the maximum number of target cells indicated in a CHO command. The IE targetCellId may be used to identify a cell within a Public Land Mobile Network (PLMN) or a specific area. The IE objectId may be used to identify a target cell in the IE TargetCelltoAddModList.

TABLE 9

| | |
|---|---|
| CHOCommand ::= | SEQUENCE { |
|   choCommandId | ChoCommandId, |
|   choreconfigurationWithSync | ChoReconfigurationWithSync, |
|   targetCelltoAddModList | TargetCelltoAddModList, |
|   targetCelltoRemoveList | TargetCelltoRemoveList, |
| } | |
| TargetCelltoAddModList ::= | SEQUENCE (SIZE (1..maxNrofTargetcell)) OF TargetCelltoAddMod |
| TargetCelltoAddMod ::= | SEQUENCE { |
|   objectId | ObjectId, |
|   targetCellId | TargetCellId, |
|   cellPriority | CellPriority, |
| } | |
| targetCelltoRemoveList ::= | SEQUENCE (SIZE (1.. maxNrofTargetcell)) OF ObjectId |
| } | |

In some implementations, a target cell indicated in a CHO command may be assigned a default cell priority. In some implementations, a common cell priority may be configured for all target cells in a CHO command. In some implementations, the cell priority of a target cell may be provided in a measurement configuration, a measurement object configuration, or a measurement report configuration, each of which may be associated with the CHO command (or the corresponding CHO command ID).

In some implementations, if multiple target cells indicated in one or more CHO commands fulfill the associated trigger condition(s), the UE may choose the target cell with the highest cell priority to connect to when the CHO command for the target cell is executed. In some other implementations, if two or more target cells have the same highest cell priority and the associated trigger condition(s) is fulfilled, the UE may choose the target cell based on its own decision. For example, if multiple NR cells are triggered in the CHO execution, the UE may determine which NR cell to select based on UE implementation. For example, the UE may consider the beams and/or the beam quality to select one of the triggered NR cells for the CHO execution. In some implementations, when a trigger condition of a CHO command is fulfilled and there are multiple target cells indicated in the CHO command, the UE may perform a target cell selection procedure in which the UE may select one of the target cells and execute the CHO command to connect to the selected target cell. In some implementations, the target cell selection procedure may be performed by the UE based on a given cell priority of each candidate target cell indicated in the CHO command. In some implementations, the target cell selection procedure may be performed based on a frequency priority. The UE may receive the frequency priority from dedicated signaling or system information. In some implementations, the target cell selection procedure may be performed based on cell loading information or other information from the NW or collected by the UE. In some implementations, S-criterion (e.g., for cell selection) and/or R-criteria (e.g., for cell reselection) may be applied to the CHO target cell selection.

Approach 4-2

In some implementations, if multiple target cells indicated in one or more CHO commands fulfill the associated trigger condition(s), the UE may choose the target cell with the highest cell priority to connect to when the CHO command of the target cell is executed. If there are more than one target cell with the same highest cell priority and the associated trigger condition(s) is fulfilled, the UE may choose the target cell with the highest signal quality to connect.

In some implementations, an example TP of the CHO command is shown in Table 10.

TABLE 10

| | |
|---|---|
| -- ASN1START | |
| -- TAG-MEASIDTOADDMODLIST-START | |
| ChoCommand ::= | SEQUENCE { |
|   choCommandID | ChoCommandID, |
|   measId | MeasId, |
|   targetCellConfiguration | OCTET STRING (CONTAINING RRCReconfiguration) |
| } | |
| -- TAG-MEASIDTOADDMODLIST-STOP | |
| -- ASN1STOP | |

As shown in Table 10, a CHO command (or the corresponding CHO command configuration, or the conditional reconfiguration IE) (e.g., ChoCommand) may include a CHO command ID (e.g., ChoCommandID) and a measurement ID (e.g., MeasId) associated with the CHO command ID. In some implementations, the CHO command may include a container that contains a target cell configuration (e.g., targetCellConfiguration) to carry information about the target cell identifier(s), or the radio parameters relevant to the target RAT (or the target base station, or the target cell).

Figure 7:
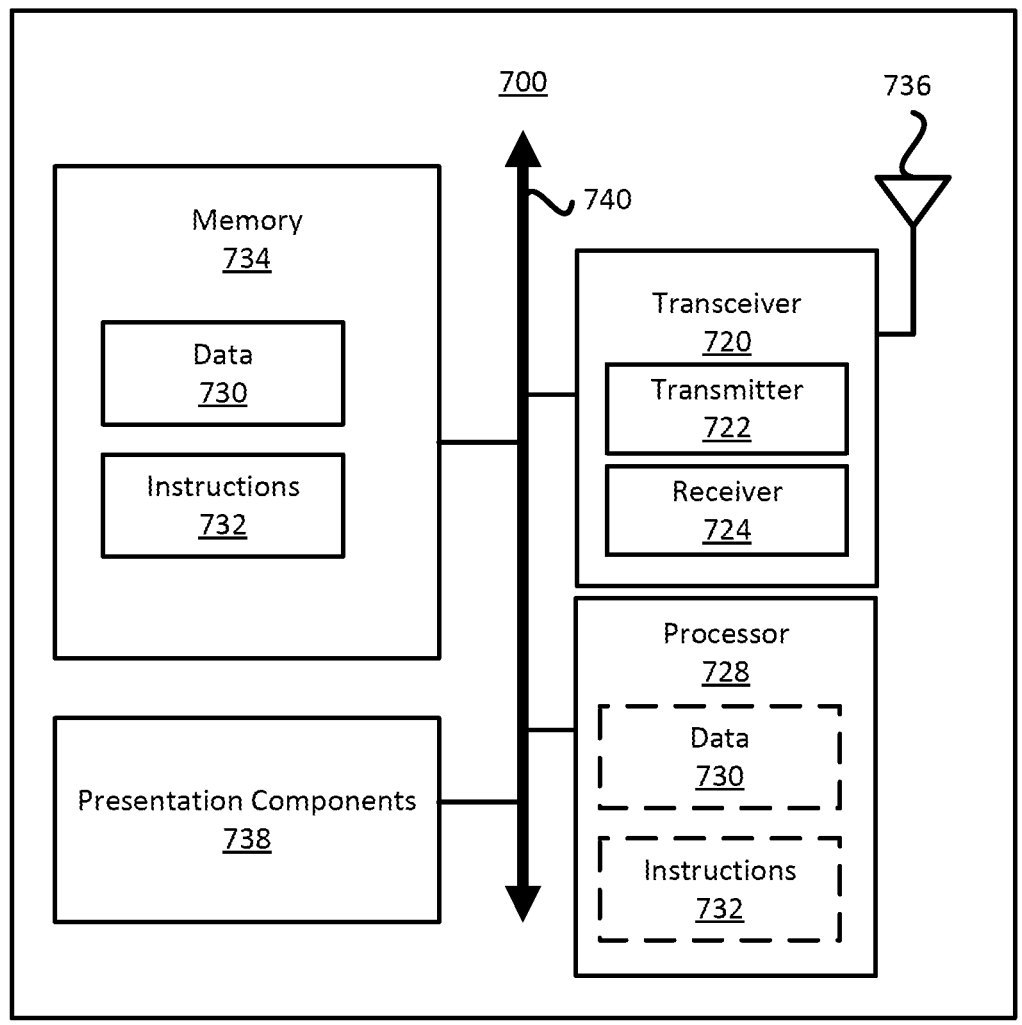
FIG. 7 is a block diagram illustrating a node for wireless communication, in accordance with various aspects of the present disclosure.

FIG. 7 is a block diagram illustrating a node for wireless communication, in accordance with various aspects of the present disclosure. As shown in FIG. 7, a node 700 may include a transceiver 720, a processor 728, a memory 734, one or more presentation components 738, and at least one antenna 736. The node 700 may also include a Radio Frequency (RF) spectrum band module, a BS communications module, a network communications module, and a system communications management module, Input/Output (I/O) ports, I/O components, and power supply (not explicitly shown in FIG. 7). Each of these components may be in communication with each other, directly or indirectly, over one or more buses 740. In one implementation, the node 700 may be a UE, a BS, or any other apparatus of wireless communications that performs various functions described herein, for example, with reference to FIGS. 1 through 6.

The transceiver 720 having a transmitter 722 (e.g., transmitting/transmission circuitry) and a receiver 724 (e.g., receiving/reception circuitry) may be configured to transmit and/or receive time and/or frequency resource partitioning information. In some implementations, the transceiver 720 may be configured to transmit in different types of subframes and slots including, but are not limited to, usable, non-usable and flexibly usable subframes and slot formats. The transceiver 720 may be configured to receive data and control channels.

The node 700 may include a variety of computer-readable media. Computer-readable media may be any available media that may be accessed by the node 700 and include both volatile and non-volatile media, removable and non-removable media. By way of example, and not limitation, computer-readable media may comprise computer storage media and communication media. Computer storage media include both volatile and non-volatile, removable and non-removable media implemented in any method or technology for storage of information such as computer-readable instructions, data structures, program modules or data.

Computer storage media include RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media do not comprise a propagated data signal. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer-readable media.

The memory 734 may include computer-storage media in the form of volatile and/or non-volatile memory. The memory 734 may be removable, non-removable, or a combination thereof. Examples of memory includes solid-state memory, hard drives, optical-disc drives, etc. As illustrated in FIG. 7, the memory 734 may store computer-readable, computer-executable instructions 732 (e.g., software codes) that are configured to, when executed, cause the processor 728 to perform various functions described herein, for example, with reference to FIGS. 1 through 6. Alternatively, the instructions 732 may not be directly executable by the processor 728 but be configured to cause the node 700 (e.g., when compiled and executed) to perform various functions described herein.

The processor 728 (e.g., having processing circuitry) may include a Central Processing Unit (CPU), a microcontroller, an ASIC, an intelligent hardware device, or any combination thereof configured to perform the functions described herein. The processor 728 may include memory. The processor 728 may process the data 730 and the instructions 732 received from the memory 734, and information through the transceiver 720, the baseband communications module, and/or the network communications module. The processor 728 may also process information to be sent to the transceiver 720 for transmission through the antenna 736, to the network communications module for transmission to a core network.

One or more presentation components 738 may present data to a person or other devices. Examples of presentation components 738 may include a display device, speaker, printing component, vibrating component, etc.

From the above description, it is manifested that various techniques may be used for implementing the concepts described in the present disclosure without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present disclosure is not limited to the particular implementations described above, but many rearrangements, modifications, and substitutions are possible without departing from the scope of the present disclosure.

What is claimed is:

1. A method for a Base Station (BS) for performing a Conditional Handover (CHO) procedure, the method comprising:
    transmitting a CHO command to a User Equipment (UE), the CHO command comprising a CHO command identity (ID) and a measurement ID associated with the CHO command ID;
    causing the UE to execute the CHO command to handover to a target BS when a trigger condition associated with the measurement ID is fulfilled;
    causing the UE to forgo transmitting a measurement report during the execution of the CHO command despite the UE being configured, via a report configuration associated with the measurement ID, to transmit the measurement report;
    transmitting, to the UE, a message that causes the UE to remove the CHO command; and
    after transmitting the message to the UE, determining that the report configuration is removed by the UE without transmitting, to the UE, an instruction to remove the report configuration.

2. The method of claim 1, wherein the message is included in a Radio Resource Control (RRC) message.

3. The method of claim 1, further comprising:
    transmitting a cell-level Reference Signal (RS) or a beam-level RS to the UE to let the UE determine whether the trigger condition is fulfilled.

4. The method of claim 3, wherein the cell-level RS comprises a cell-level Synchronization Signal Block (SSB) and the beam-level RS comprises a beam-level Channel State Information-Reference Signal (CSI-RS).

5. The method of claim 1, further comprising:
    receiving CHO failure information in a Minimization of Drive Tests (MDT) report from the UE in a case that the execution of the CHO command fails.

6. The method of claim 5, wherein the CHO failure information in the MDT report comprises at least one of:
    an ID of a failed CHO command,
    a configuration related to the failed CHO command,
    a cause value indicating a CHO failure event,
    an ID of a failed target cell,
    an ID of a failed target BS, or
    a latest measurement result.

7. The method of claim 1, further comprising:
    performing a Radio Resource Control (RRC) re-establishment procedure with the UE; and determining that all CHO commands, including the CHO command, stored at the UE are removed by the UE when performing the RRC re-establishment procedure.

8. A Base Station (BS) for performing a Conditional Handover (CHO) procedure, the BS comprising:
transmission and reception circuitry; and
at least one processor coupled to the transmission and reception circuitry and configured to:
transmit, by the transmission and reception circuitry, a CHO command to a User Equipment (UE), the CHO command comprising a CHO command identity (ID) and a measurement ID associated with the CHO command ID;
cause the UE to execute the CHO command to handover to a target BS when a trigger condition associated with the measurement ID is fulfilled;
cause the UE to forgo transmitting a measurement report during the execution of the CHO command despite the UE being configured, via a report configuration associated with the measurement ID, to transmit the measurement report;
transmit, by the transmission and reception circuitry, to the UE, a message that causes the UE to remove the CHO command; and
after transmitting the message to the UE, determine that the report configuration is removed by the UE without transmitting, to the UE, an instruction to remove the report configuration.

9. The BS of claim 8, wherein the message is included in a Radio Resource Control (RRC) message.

10. The BS of claim 8, wherein the at least one processor is further configured to:
transmit, by the transmission and reception circuitry, a cell-level Reference Signal (RS) or a beam-level RS to the UE to let the UE determine whether the trigger condition is fulfilled.

11. The BS of claim 10, wherein the cell-level RS comprises a cell-level Synchronization Signal Block (SSB) and the beam-level RS comprises a beam-level Channel State Information-Reference Signal (CSI-RS).

12. The BS of claim 8, wherein the at least one processor is further configured to:
receive, by the transmission and reception circuitry, CHO failure information in a Minimization of Drive Tests (MDT) report from the UE in a case that the execution of the CHO command fails.

13. The BS of claim 12, wherein the CHO failure information in the MDT report comprises at least one of:
an ID of a failed CHO command,
a configuration related to the failed CHO command,
a cause value indicating a CHO failure event,
an ID of a failed target cell,
an ID of a failed target BS, or
a latest measurement result.

14. The BS of claim 8, wherein the at least one processor is further configured to:
perform a Radio Resource Control (RRC) re-establishment procedure with the UE; and
determine that all CHO commands, including the CHO command, stored at the UE are removed by the UE when performing the RRC re-establishment procedure.

* * * * *